United States Patent [19]

Chen

[11] Patent Number: 5,556,222
[45] Date of Patent: Sep. 17, 1996

[54] QUICK RELEASE MECHANISM

[76] Inventor: Chun-Hsung Chen, No. 18-1, Nan-Yang Rd., Feng-Yuan City, Taichung Hsien, Taiwan

[21] Appl. No.: 385,353

[22] Filed: Feb. 8, 1995

[51] Int. Cl.⁶ .............................. B25G 3/18; F16B 21/00; F16D 1/12
[52] U.S. Cl. ............................ 403/323; 403/79; 403/157; 403/320
[58] Field of Search ............................. 403/79, 150, 158, 403/159, 321, 323, 324, 320, 362

Primary Examiner—Kenneth J. Dorner
Assistant Examiner—Bruce A. Lev
Attorney, Agent, or Firm—Renner, Otto, Boisselle & Sklar

[57] ABSTRACT

A quick release mechanism includes a cylindrical rod having two opposed ends and an intermediate portion formed with a diametrically extending screw hole. A mounting shaft has first and second threaded ends. A locking nut is connected to the second threaded end of the mounting shaft. A manually operated lever has an end portion and a pair of spaced lugs which extend longitudinally from the end portion and which are formed with aligned eccentric holes that receive respectively the opposed ends of the cylindrical rod therein. Each of the lugs has a cam edge. A pressing member has a concave surface in contact with the cam edges of the manually operated lever and a generally U-shaped connecting member which has two distal ends extending integrally from the surface of the pressing member. The connecting member and the pressing member cooperatively define therebetween an oblong receiving space for receiving the cylindrical rod therein. The pressing member is formed therethrough with a through-hole which is aligned with an axis of the connecting member and which is communicated with the receiving space so as to permit the first threaded end of the mounting shaft to extend into the receiving space through the through-hole and to connect with the screw hole of the cylindrical rod. The connecting member and the cylindrical rod fill up a space between the lugs.

2 Claims, 7 Drawing Sheets

QUICK RELEASE MECHANISM

BACKGROUND OF THE INVENTION

1. Field of the Invention

This invention relates to a quick release mechanism, more particularly to a quick release mechanism which is easy to assemble and which has provisions to assure proper operation thereof even after a long period of use.

2. Description of the Related Art

Referring to FIG. 1, a conventional quick release mechanism is shown to comprise a cylindrical rod 12 which is formed with a diametrically extending screw hole 122. A mounting shaft 14 has a first threaded end 141 connected threadably to the screw hole 122 of the cylindrical rod 12. A locking nut 15 is connected threadably to a second threaded end 142 of the mounting shaft 14. A pressing member 13 is sleeved on the mounting shaft 14 adjacent to the cylindrical rod 12 and has a concave surface 132 which faces the cylindrical rod 12. A manually operated lever 11 has an end portion 113 and a pair of spaced lugs 112 which extend longitudinally from the end portion 113 and which are formed with aligned eccentric holes 114 that receive respectively two opposed ends of the cylindrical rod 12 therein. Each of the lugs 112 has a cam edge (112a) which complements and which is in contact with the concave surface 132 of the pressing member 13.

Referring to FIG. 2, the conventional quick release mechanism is used to secure a hub 21 of a bicycle wheel on a bicycle fork. As illustrated, the mounting shaft 14 extends into the hub 21. The lever 11 is in a tightened position, wherein the lever 11 is generally perpendicular to the mounting shaft 14, the cam edges (112a) of the lever 11 push the pressing member 13 to abut against an outer side of one of the prongs 22 of the bicycle fork, and the locking nut 15 is pulled to abut against an outer side of the other one of the prongs 22 of the bicycle fork so as to clamp tightly the hub 21 to the bicycle fork. To release the hub 21 from the bicycle fork, the lever 11 is operated to pivot about the cylindrical rod 12 to a slack position, wherein the lever 11 is generally perpendicular to the mounting shaft 14, the locking nut 15 is biased by a spring means (not shown) to move axially away from the outer side of the corresponding prong 22 of the bicycle fork, and the pressing member 13 is biased by another spring means (not shown) to move axially away from the outer side of the corresponding prong 22 of the bicycle fork.

Referring to FIGS. 2 and 3, it should be noted that the concave surface 132 of the pressing member 13 must be initially rotated to an appropriate position corresponding to the cam edges (112a) of the lever 11 before moving the lever 11 from the slack position to the tightened position every time, thereby inconveniencing the assembly of the conventional quick release mechanism. Furthermore, since a space (A) formed between the lugs 112 is not filled up by the cylindrical rod 12, dirt (not shown) or the like will accumulate in the space (A) and will harden after a period of use, thereby hindering pivoting movement of the lever 11 between the tightened position and the slack position.

SUMMARY OF THE INVENTION

Therefore, the main objective of the present invention is to provide a quick release mechanism which is easy to assemble and which has provisions to assure proper operation thereof even after a long period of use.

According to the present invention, a quick release mechanism includes a cylindrical rod having two opposed ends and an intermediate portion formed with a diametrically extending screw hole. A mounting shaft has a first threaded end connected threadably to the screw hole of the cylindrical rod, and a second threaded end. A locking nut is connected threadably to the second threaded end of the mounting shaft. A manually operated lever has an end portion and a pair of spaced lugs which extend longitudinally from the end portion and which are formed with aligned eccentric holes that receive respectively the opposed ends of the cylindrical rod therein. Each of the lugs has a cam edge. A pressing member has a concave surface in contact with the cam edges of the manually operated lever and a generally U-shaped connecting member which has two distal ends extending integrally from the surface of the pressing member. The connecting member and the pressing member cooperatively define therebetween an oblong receiving space for receiving the cylindrical rod therein. The pressing member is formed therethrough with a through-hole which is aligned with an axis of the connecting member and which is communicated with the receiving space so as to permit the first threaded end of the mounting shaft to extend into the receiving space through the through-hole and to connect threadably with the screw hole of the cylindrical rod. The connecting member and the cylindrical rod fill up a space between the lugs.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENT

Figure 1:
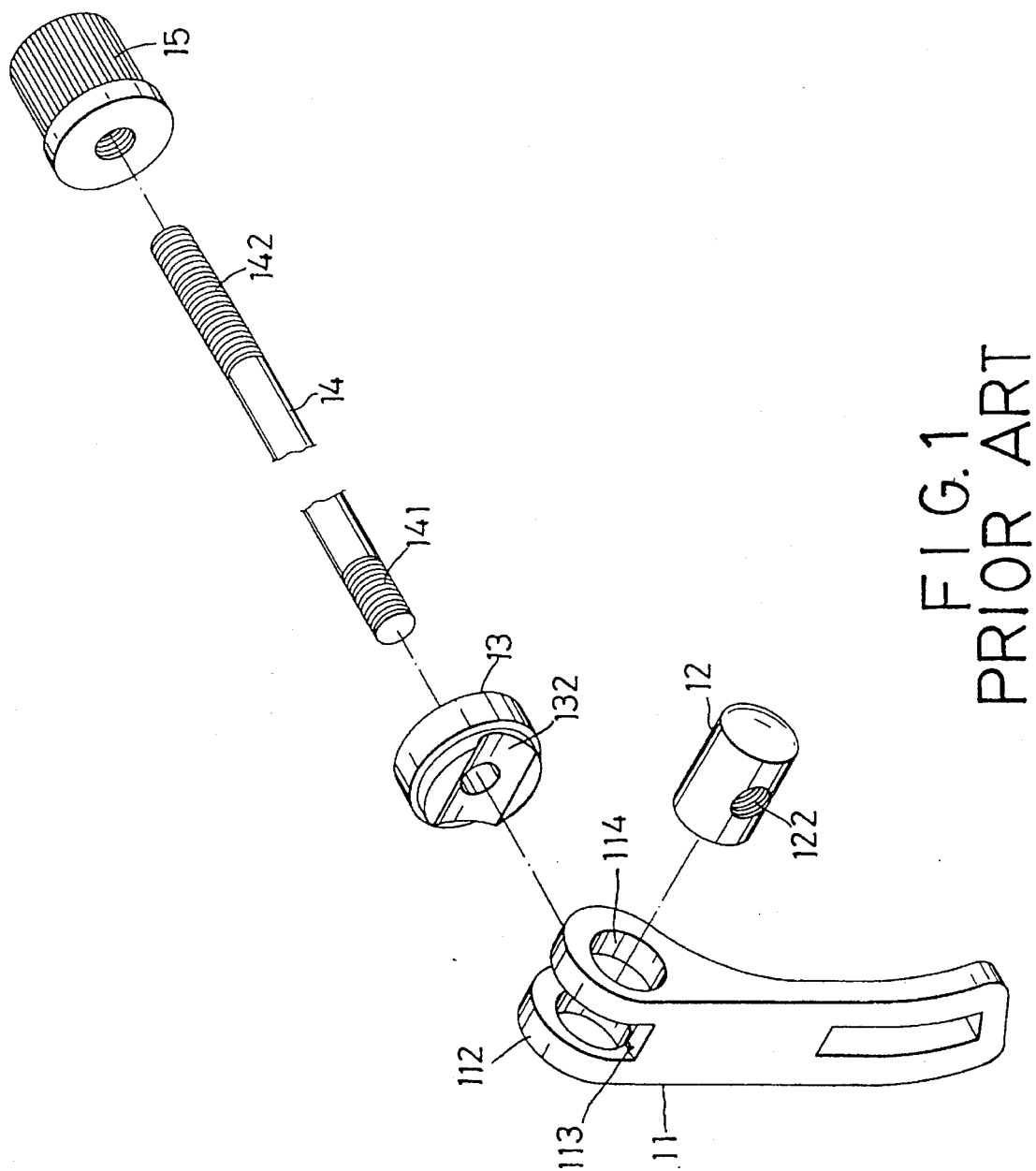
FIG. 1 is an exploded view showing a conventional quick release mechanism.
Figure 2:
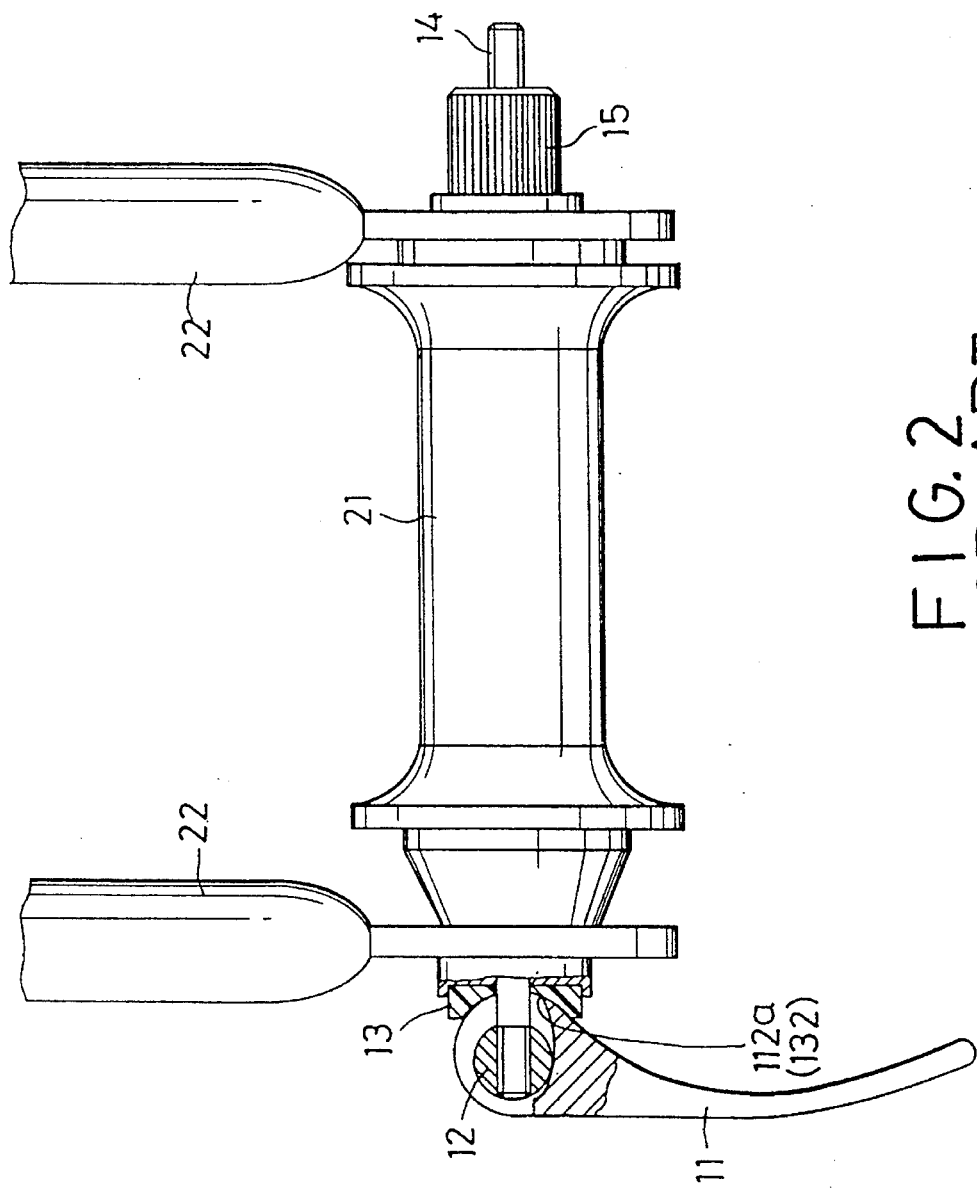
FIG. 2 is a partly sectional view of the conventional quick release mechanism when used to secure a bicycle wheel on a bicycle fork.
Figure 3:
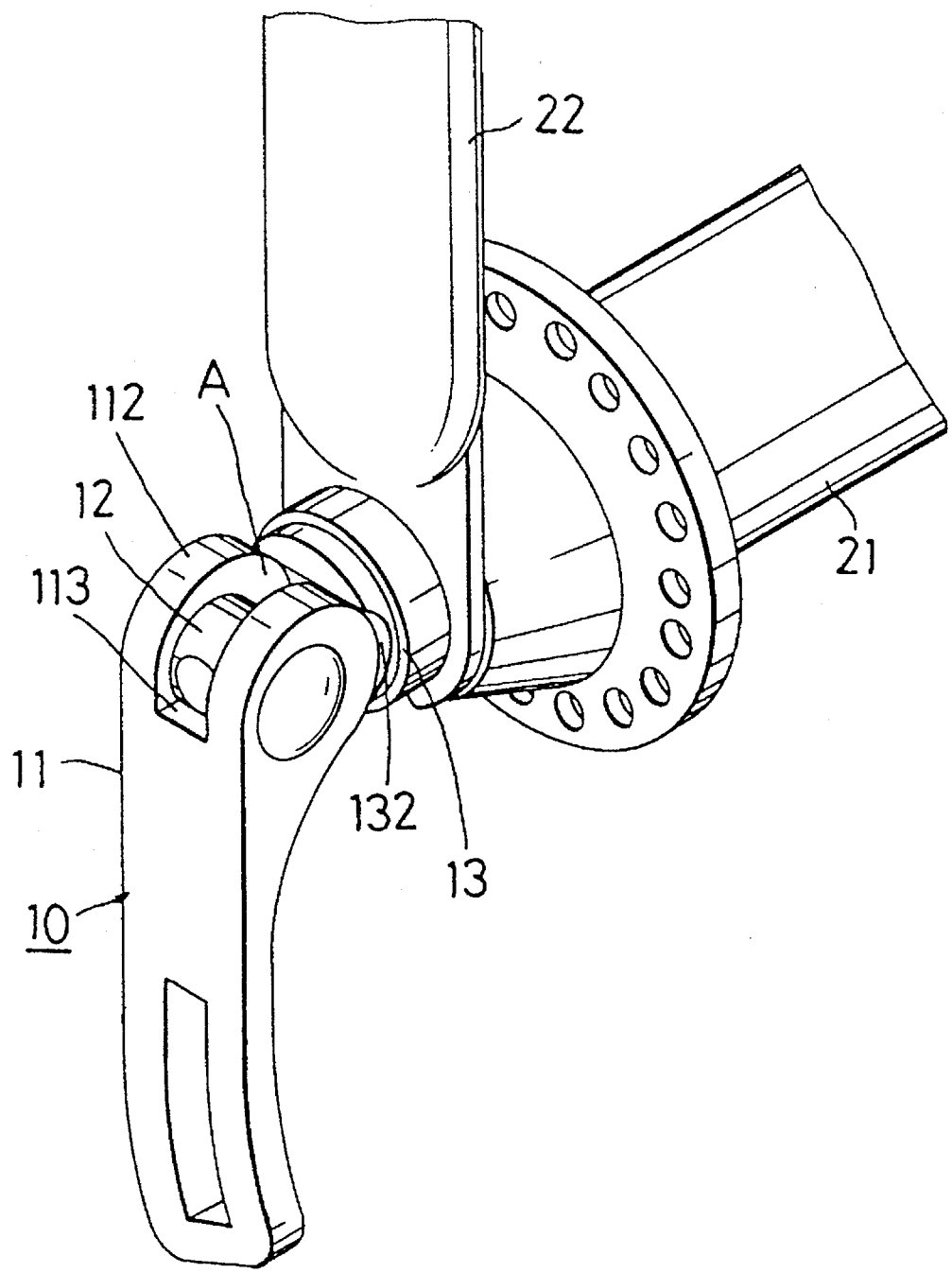
FIG. 3 is an enlarged view illustrating a part of the conventional quick release mechanism shown in FIG. 2.
Figure 4:
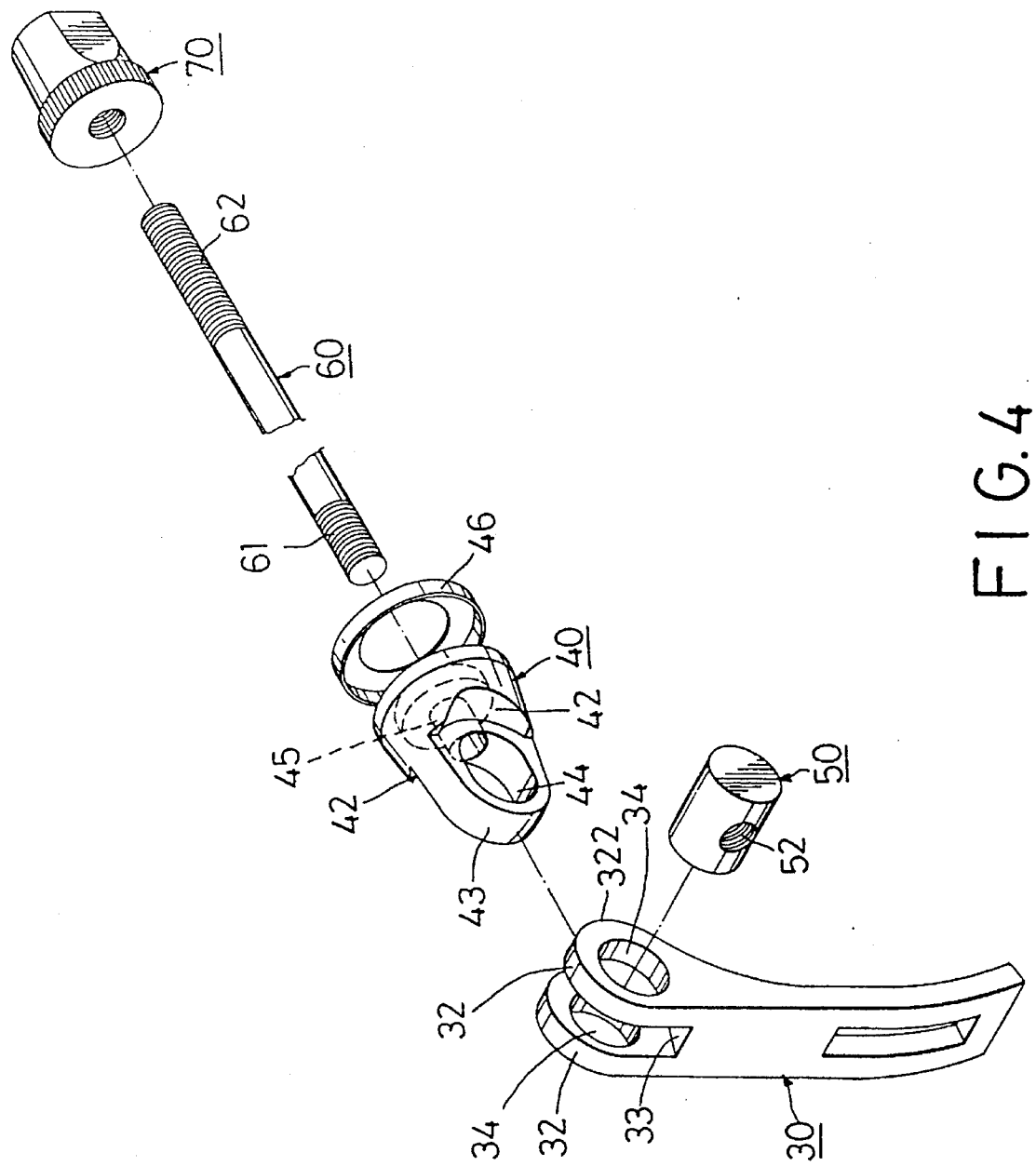
FIG. 4 is an exploded view of the preferred embodiment of a quick release mechanism according to the preset invention.

Referring to FIG. 4, a quick release mechanism according to a first preferred embodiment of the present invention includes a cylindrical rod 50, a mounting shaft 60, a locking nut 70, a pressing member 40 and a manually operated lever 30.

The cylindrical rod 50 has two opposed ends and an intermediate portion which is formed with a diametrically extending screw hole 52.

The mounting shaft 60 has a first threaded end 61 which is connected threadably to the screw hole 52 of the cylindrical rod 50, and a second threaded end 62.

The locking nut 70 is connected threadably to the second threaded end 62 of the mounting shaft 60.

The manually operated lever 30 has an end portion 33 and a pair of spaced lugs 32 which extend longitudinally from the end portion 33 and which are formed with aligned eccentric holes 34 that receive respectively the opposed ends of the cylindrical rod 50 therein. Each of the lugs 32 has a cam edge 322.

The pressing member 40 has a concave surface 42 which is in contact with the cam edges 322 of the manually operated lever 30, a generally U-shaped connecting member 43 which has two distal ends extending integrally from the concave surface 42 of the pressing member 40, and a connecting surface which is opposite to the concave surface 42. In the present embodiment, the pressing member 40 may be made of injection-molded plastic or metal. The connecting member 43 and the pressing member 40 cooperatively define therebetween an oblong receiving space 44 for receiving the cylindrical rod 50 therein. The pressing member 40 is formed therethrough with a through-hole 45 which is aligned with an axis (not shown) of the connecting member 43 and which is communicated with the receiving space 44 so as to permit the first threaded end 61 of the mounting shaft 60 to extend into the receiving space 44 through the through-hole 45 and to connect threadably with the screw hole 52 of the cylindrical rod 50. A metal ring 46 is sleeved on the mounting shaft 60 and is secured to the connecting surface of the pressing member 40.

Figure 5:
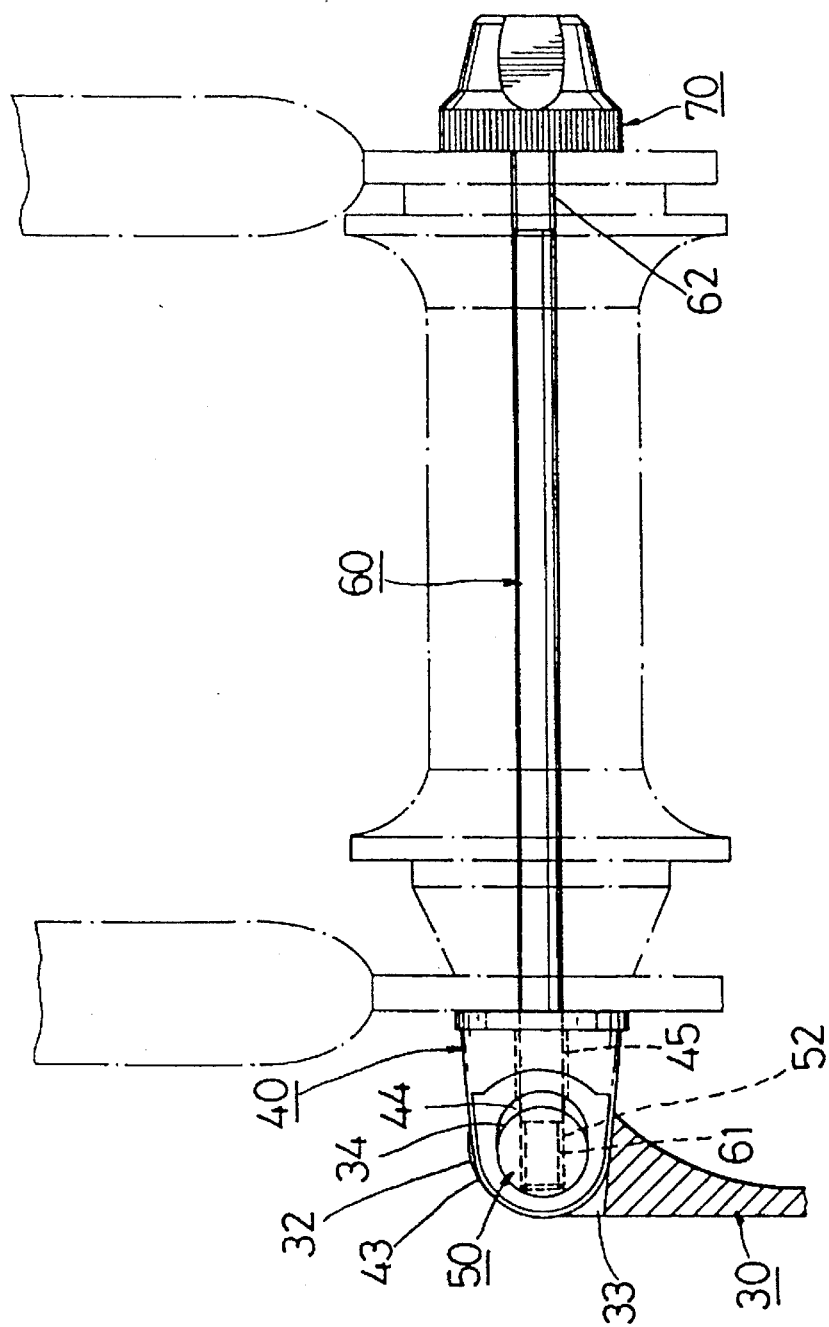
FIG. 5 is a partly sectional view of the preferred embodiment when used to secure a bicycle wheel on a bicycle fork.

Referring now to FIG. 5, the preferred embodiment is used to secure the hub (shown in phantom lines) of a bicycle wheel on a bicycle fork (shown in phantom lines). It should be appreciated that the metal ring 46 has a contact surface which is opposite to the connecting surface of the pressing member 40 and which abuts against an other side of one of the prongs (shown in phantom lines) of the bicycle fork. Since the operation of the preferred embodiment is similar to that of the conventional quick release mechanism described beforehand, a detailed description thereof will be omitted herein.

Figure 6:
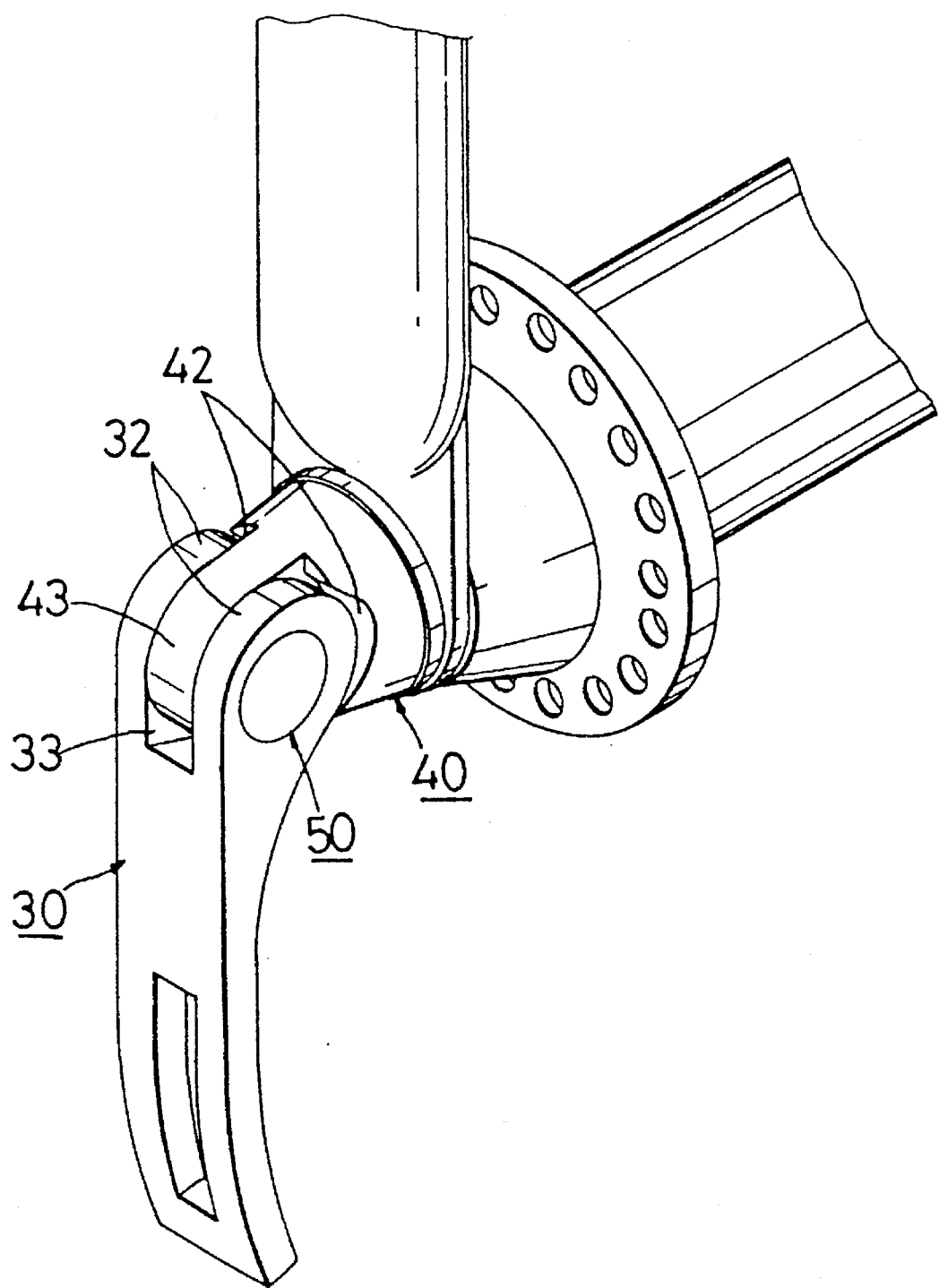
FIG. 6 is an enlarged view illustrating a part of the preferred embodiment shown in FIG. 5.

Accordingly, since the connecting member 43 extends into the space formed between the lugs 32 of the lever 30, and since the cylindrical rod 50 extends through the receiving space 44 defined between the connecting member 43 and the pressing member 40, the connecting member 43 cannot rotate relative to the cylindrical rod 50, thereby ensuring that the concave surface 42 of the pressing member 40 is kept in an appropriate position corresponding to the cam edges 322 of the lever 30 in order to facilitate the assembly of the quick release mechanism according to the present invention. Furthermore, referring to FIGS. 5 and 6, since the connecting member 43 and the cylindrical rod 50 fill up a space formed between the lugs 32 of the lever 30, no dirt or the like will accumulate therein after a period of use, thereby assuring smooth pivoting movement of the lever 30.

Figure 7:
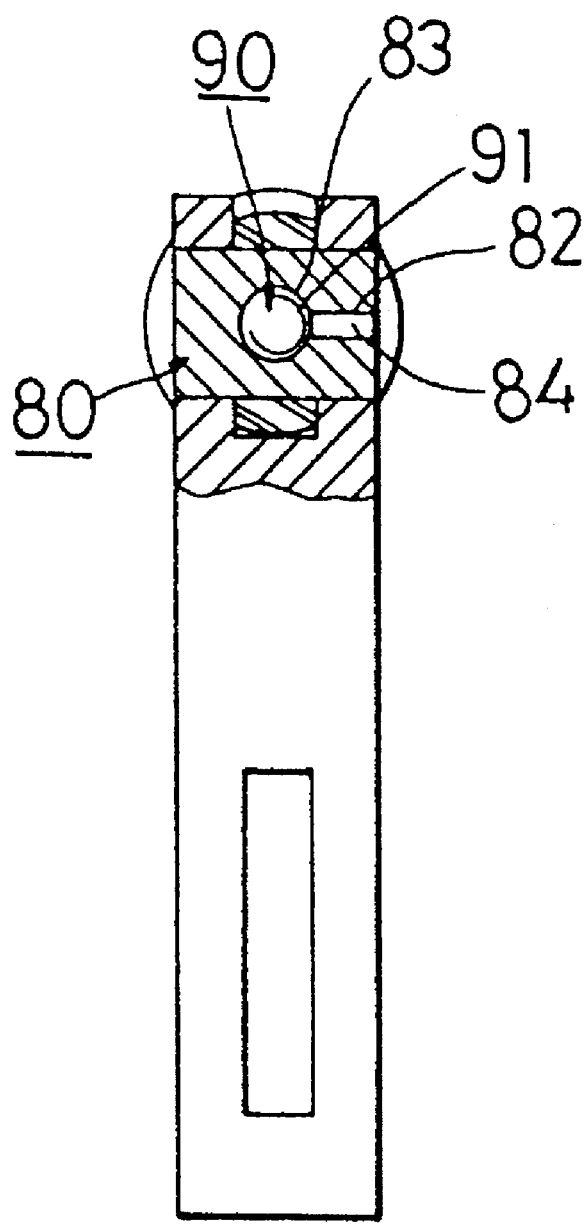
FIG. 7 is a partly sectional side view of the second preferred embodiment of a quick release mechanism according to the present invention.

Referring now to FIG. 7, a second embodiment of the present invention is shown. In this embodiment, one of the opposed ends of said cylindrical rod 80 has an end surface formed with an axial passage 82 which is communicated with the screw hole 83 of the cylindrical rod 80. A positioning pin 84 extends through the axial passage 82 and has an inner end abutting against the first threaded end 91 of the mounting shaft 90 so as to prevent movement of the first threaded end 91 of the mounting shaft 90 relative to the cylindrical rod 80 due to the resulting vibrations when the bicycle is in use, thereby preventing untimely disengagement of the first threaded end 91 of the mounting shaft 90 from the cylindrical rod 80 after a period of use.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A quick release mechanism including a cylindrical rod having two opposed ends and an intermediate portion formed with a diametrically extending screw hole, a mounting shaft having a first threaded end connected threadably to said screw hole of said cylindrical rod, and a second threaded end, a locking nut connected threadably to said second threaded end of said mounting shaft, and a manually operated lever having an end portion and a pair of spaced lugs which extend longitudinally from said end portion and which are formed with aligned eccentric holes that receive respectively said opposed ends of said cylindrical rod therein, each of said lugs having a cam edge, wherein the improvement comprises:

a pressing member having a concave surface in contact with said cam edges of said manually operated lever and a generally U-shaped connecting member which has two distal ends extending integrally from said surface of said pressing member, said connecting member and said pressing member cooperatively defining therebetween an oblong receiving space for receiving said cylindrical rod therein, said pressing member being formed therethrough with a through-hole which is aligned with an axis of said connecting member and which is communicated with said receiving space so as to permit said first threaded end of said mounting shaft to extend into said receiving space through said through-hole and to connect threadably with said screw hole of said cylindrical rod, said connecting member and said cylindrical rod filling up a space formed between said lugs.

2. A quick release mechanism as claimed in claim 1, wherein one of said opposed ends of said cylindrical rod has an end surface formed with an axial passage which is communicated with said screw hole of said cylindrical rod, said quick release mechanism further comprising a positioning pin which extends through said axial passage and which has an inner end abutting against said first threaded end of said mounting shaft.

* * * * *